United States Patent
Pei et al.

(10) Patent No.: US 10,754,036 B2
(45) Date of Patent: Aug. 25, 2020

(54) SCANNING ILLUMINATED THREE-DIMENSIONAL IMAGING SYSTEMS

(71) Applicant: Cepton Technologies, Inc., San Jose, CA (US)

(72) Inventors: Jun Pei, Saratoga, CA (US); Mark McCord, Los Gatos, CA (US); Jun Ye, Palo Alto, CA (US); Yupeng Cui, San Jose, CA (US); Liqun Han, Pleasanton, CA (US)

(73) Assignee: Cepton Technologies, Inc., San Jose, CA (US)

( * ) Notice: Subject to any disclaimer, the term of this patent is extended or adjusted under 35 U.S.C. 154(b) by 348 days.

(21) Appl. No.: 15/389,368

(22) Filed: Dec. 22, 2016

(65) Prior Publication Data

US 2017/0310948 A1    Oct. 26, 2017

Related U.S. Application Data

(60) Provisional application No. 62/327,447, filed on Apr. 26, 2016.

(51) Int. Cl.
*G01S 17/89* (2020.01)
*H04N 13/254* (2018.01)
(Continued)

(52) U.S. Cl.
CPC .............. *G01S 17/89* (2013.01); *B60R 1/00* (2013.01); *B60R 11/04* (2013.01); *G01S 7/484* (2013.01);
(Continued)

(58) Field of Classification Search
None
See application file for complete search history.

(56) References Cited

U.S. PATENT DOCUMENTS 6,629,641 B2 * 10/2003 Tsikos .................. B82Y 15/00
                                                        235/454
7,544,945 B2    6/2009 Tan et al.
(Continued)

FOREIGN PATENT DOCUMENTS

JP           3169074 B2    5/2001
JP       2002181533 A      6/2002
(Continued)

OTHER PUBLICATIONS

Lu et al.; "Image-Based Distance and Area Measuring Systems"; IEEE Sensors Journal, vol. 6, No. 2, Apr. 2006, pp. 495-503. (Year: 2006).*

(Continued)

*Primary Examiner* — Kaitlin A Retallick
(74) *Attorney, Agent, or Firm* — Kilpatrick Townsend & Stockton LLP

(57) ABSTRACT

A three-dimensional imaging system includes a first illumination source configured to project a first fan of light toward an object in a field of view, and a second illumination source configured to project a second fan of light substantially parallel to and spaced apart from the first fan of light. The first illumination source and the second illumination source are further configured to scan the first fan of light and the second fan of light synchronously laterally across the field of view. The three-dimensional imaging system further includes a camera configured to capture a plurality of image frames of the field of view as the first fan of light and the second fan of light are scanned over a plurality of regions the object, and a processor coupled to the camera and configured to construct a three-dimensional image of the object based on the plurality of image frames.

11 Claims, 15 Drawing Sheets

(51) Int. Cl.

| | |
|---|---|
| *H04N 13/239* | (2018.01) |
| *G01S 7/481* | (2006.01) |
| *G01S 17/87* | (2020.01) |
| *G01S 17/10* | (2020.01) |
| *G01S 7/497* | (2006.01) |
| *G06T 7/521* | (2017.01) |
| *G01S 7/486* | (2020.01) |
| *G01S 17/931* | (2020.01) |
| *G01S 7/484* | (2006.01) |
| *G01S 7/4865* | (2020.01) |
| *G06T 7/70* | (2017.01) |
| *B60R 1/00* | (2006.01) |
| *B60R 11/04* | (2006.01) |
| *G06K 9/00* | (2006.01) |
| *G01S 17/42* | (2006.01) |
| *B60R 11/00* | (2006.01) |

(52) U.S. Cl.
CPC .......... *G01S 7/4811* (2013.01); *G01S 7/4815* (2013.01); *G01S 7/4816* (2013.01); *G01S 7/4817* (2013.01); *G01S 7/4865* (2013.01); *G01S 7/4868* (2013.01); *G01S 7/4972* (2013.01); *G01S 17/10* (2013.01); *G01S 17/42* (2013.01); *G01S 17/87* (2013.01); *G01S 17/931* (2020.01); *G06K 9/00805* (2013.01); *G06T 7/521* (2017.01); *G06T 7/70* (2017.01); *H04N 13/239* (2018.05); *H04N 13/254* (2018.05); *B60R 2011/004* (2013.01); *B60R 2300/103* (2013.01); *B60R 2300/105* (2013.01); *B60R 2300/8093* (2013.01)

(56) References Cited

U.S. PATENT DOCUMENTS

| | | | |
|---|---|---|---|
| 2003/0174305 A1* | 9/2003 | Kasper | G01C 15/002 356/3.09 |
| 2004/0141170 A1 | 7/2004 | Jamieson et al. | |
| 2004/0233416 A1* | 11/2004 | Doemens | G01S 17/894 356/5.01 |
| 2007/0219720 A1* | 9/2007 | Trepagnier | G05D 1/0278 701/300 |
| 2008/0246943 A1 | 10/2008 | Kaufman et al. | |
| 2014/0043309 A1* | 2/2014 | Go | G01S 17/89 345/207 |
| 2015/0075066 A1 | 3/2015 | Stowe et al. | |
| 2015/0296201 A1 | 10/2015 | Banks | |

FOREIGN PATENT DOCUMENTS

| | | | | |
|---|---|---|---|---|
| WO | WO 2014/060562 A1 | 4/2014 | | |
| WO | WO-2014060562 A1 * | 4/2014 | ............ | H04N 5/247 |

OTHER PUBLICATIONS

Notification Of Transmittal Of The International Search Report And The Written Opinion Of The International Searching Authority, Or the Declaration for corresponding International Patent Application No. PCT/US2017/025785 dated Aug. 16, 2017, 16 pages.

Invitation To Pay Additional Fees And, Where Applicable, Protest Fee and Partial Search Report for corresponding International Patent Application No. PCT/US2017/025785 dated Jun. 8, 2017, 2 pages.

EP17790087.5, "Extended European Search Report", dated Nov. 27, 2019, 8 pages.

* cited by examiner

SCANNING ILLUMINATED THREE-DIMENSIONAL IMAGING SYSTEMS

CROSS-REFERENCES TO RELATED APPLICATIONS

This application claims the benefit of U.S. Provisional Patent Application No. 62/327,447, filed on Apr. 26, 2016, the contents of which is incorporated by reference in its entirety.

BACKGROUND OF THE INVENTION

Three-dimensional sensors are important for autonomous vehicles, drones, and other applications. They may be used, for example, for obstacle detection in an autonomous vehicle. A conventional three-dimensional imaging system may include two cameras separated by a base distance. An object's images captured by the two cameras will display at different coordinates due to the lateral disparity. The object distance from the three-dimensional imaging system can be calculated with the image difference. The conventional three-dimensional imaging system, however, may have a number of limitations. For example, if the object has no distinguishable features, identification of corresponding locations cannot be made. Also, if illumination is poor or is too strong such that it exceeds the dynamic range of the camera, the depth measurement can become unreliable. Furthermore, if the object is located at a relatively long distance from the three-dimensional imaging system compared to the baseline distance, the measurement accuracy may be critically dependent on the image quality and the stability of baseline distance, both of which may be difficult to control, especially in automotive environment. Therefore, improved three-dimensional imaging systems are desired.

SUMMARY OF THE INVENTION

The present invention relates generally to three-dimensional imaging systems. More specifically, the present invention relates to three-dimensional imaging systems using scanning illuminations. According to an embodiment of the present invention, a three-dimensional imaging system includes a first illumination source configured to project a first fan of light toward an object in a field of view. The first fan of light may generate a first illumination line as the first fan of light strikes the object. The three-dimensional imaging system further includes a second illumination source configured to project a second fan of light substantially parallel to and spaced apart from the first fan of light. The second fan of light may generate a second illumination line as the second fan of light strikes the object. The first illumination source and the second illumination source are further configured to scan the first fan of light and the second fan of light synchronously laterally across the object. The three-dimensional imaging system further includes a camera configured to capture a plurality of image frames of the field of view as the first fan of light and the second fan of light are scanned over a plurality of regions the object. Each image frame includes an image of the first illumination line and the second illumination line when the first fan of light and the second fan of light strike a respective region of the object. The three-dimensional imaging system further includes a processor coupled to the camera and configured to construct a three-dimensional image of the object based on the plurality of image frames.

According to another embodiment of the present invention, a three-dimensional imaging system includes an illumination source configured to project a fan of light toward an object in a field of view. The fan of light may generate an illumination line as the fan of light strikes the object. The illumination source is further configured to scan the fan of light laterally across the field of view. The three-dimensional imaging system further includes a first camera positioned laterally separated from the illumination source by a first baseline distance. The first camera is configured to capture a plurality of first image frames of the field of view as the fan of light is scanned over a plurality of regions of the object. Each first image frame includes an image of the illumination line when the fan of light strikes a respective region of the object. The three-dimensional imaging system further includes a processor coupled to the first camera. The processor is configured to, for each of the plurality of first image frames, determine a position of the illumination line in the respective first image frame, and determine a distance from the three-dimensional imaging system to the respective region of the object corresponding to the respective first image frame based on the determined position. The processor is further configured to construct a three-dimensional image of the object based on a plurality of distances from the camera to the plurality of regions of the object determined from the plurality of first image frames.

According to a further embodiment of the present invention, a three-dimensional imaging system includes a first illumination source configured to project a first structured illumination toward an object in a field of view. The first structure illumination may generate a first distorted illumination pattern as the first structure illumination strikes the object. The three-dimensional imaging system further includes a second illumination source configured to project a second structured illumination toward the object in the field of view. The second structure illumination may generate a second distorted illumination pattern as the second structure illumination strikes the object. The three-dimensional imaging system further includes a camera positioned laterally separated from the first illumination source by a first baseline distance and from the second illumination source by a second baseline distance. The camera is configured to capture an image frame of the field of view, the image frame including at least one of an image of the first distorted illumination pattern and an image of the second distorted illumination pattern. The three-dimensional imaging system further includes a processor coupled to the camera and configured to construct a three-dimensional image of the object based on at least one of the image of the first distorted illumination pattern and the image of the second distorted illumination pattern.

In some embodiments, the first baseline distance may be selected for a predetermined distance resolution, and the second baseline distance may be selected for a predetermined distance detection range. In one embodiment, the processor is further configured to construct a first three-dimensional image of the object based on the image of the first distorted illumination pattern, construct a second three-dimensional image of the object based on the image of the second distorted illumination pattern, and calibrate the first three-dimensional image of the object using the second three-dimensional image of the object to obtain the three-dimensional image of the object. In one embodiment, the first illumination source includes a first laser source configured to emit a first laser beam, and a first diffractive optical element configured to convert the first laser beam into the first structure illumination; the second illumination source includes a second laser source configured to emit a second laser beam, and a second diffractive optical element configured to convert the second laser beam into the second structure illumination. In one embodiment, the first structured illumination has a first pattern, and the second structure illumination has a second pattern different from the first pattern. In one embodiment, the first illumination source is configured to modulate the first illumination pattern at a predetermined frequency, and the second illumination source is configured to modulate the second illumination pattern at the predetermined frequency but at an offset phase with respect to the first illumination pattern.

These and other embodiments of the invention along with many of its advantages and features are described in more detail in conjunction with the text below and attached figures.

DETAILED DESCRIPTION OF SPECIFIC EMBODIMENTS

Figure 1:
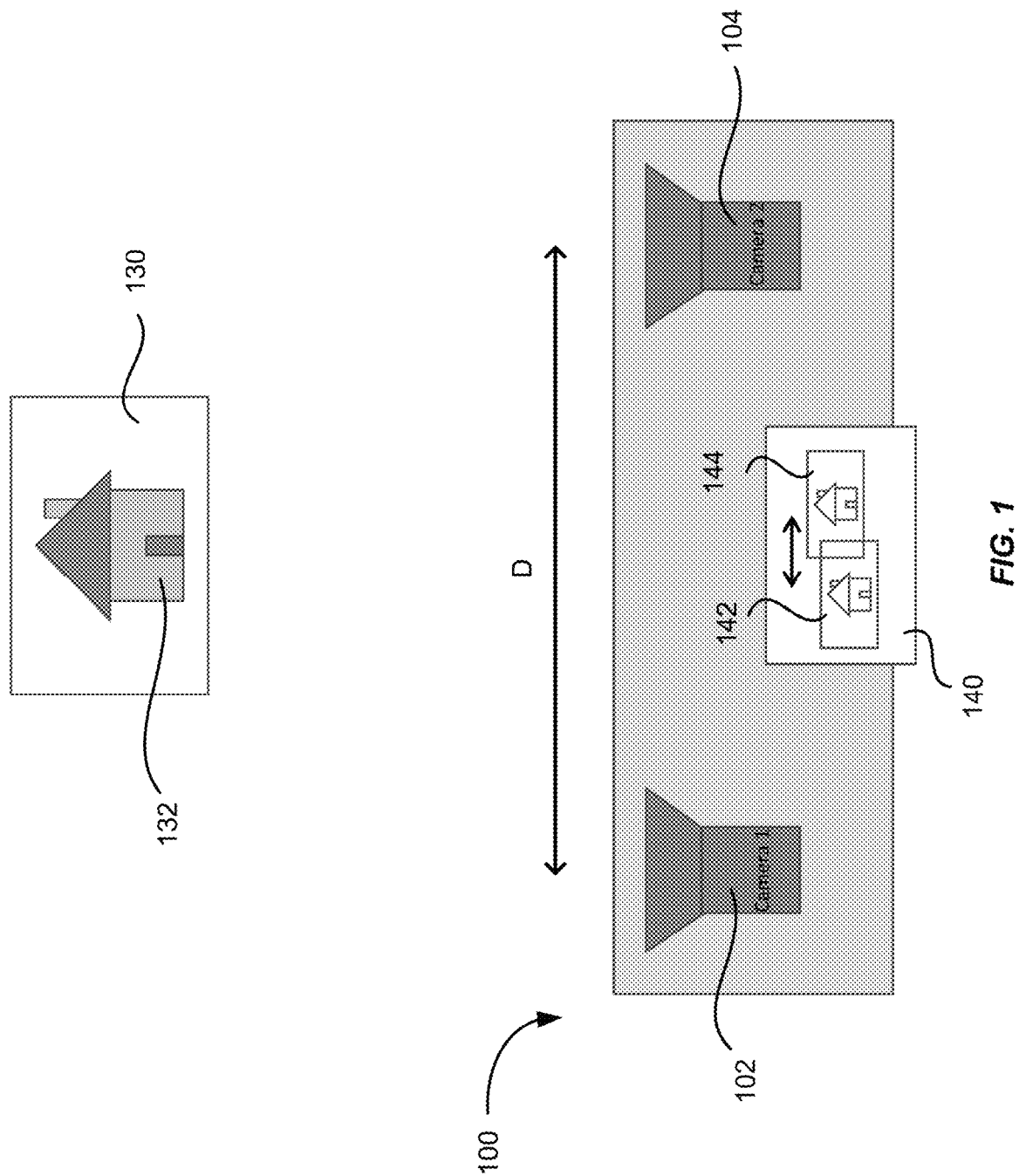
FIG. 1 illustrates schematically a conventional three-dimensional imaging system.

The present invention relates generally to three-dimensional imaging systems for three-dimensional sensing. FIG. 1 illustrates schematically a conventional three-dimensional imaging system 100, which includes a first camera 102 and a second camera 104 displaced laterally from one another with a baseline distance D. The first camera 102 and the second camera 104 may be used to obtain a first image 142 and a second image 144, respectively, of a scene 130. An object 132 in the scene, for example a house, may appear at different image coordinates in the two images 142 and 144 due to parallax, in a manner similar to human binocular vision. By comparing these two images 142 and 144, the relative depth information can be obtained in the form of a disparity map, which encodes the difference in horizontal coordinates of corresponding image points. The values in this disparity map may be inversely proportional to the scene depth at the corresponding pixel location. Thus, depth information about the object 132 relative to the three-dimensional imaging system 100 can be determined from the disparity map.

The conventional three-dimensional imaging system 100 illustrated in FIG. 1, however, may have a number of limitations. For example, if the object has no distinguishable features (i.e., texture-less or feature-less), then identification of corresponding locations cannot be made. As a result, depth information about the object cannot be extracted from the images. As another example, if illumination is poor or is too strong such that it exceeds the dynamic range of the camera, the depth measurement can become unreliable. Furthermore, if the object is located at a relatively long distance from the three-dimensional imaging system 100 compared to the baseline distance D, the measurement accuracy may be critically dependent on the image quality and the stability of baseline distance D, both of which may be difficult to control, especially in automotive environment. Embodiments of the present invention provide three-dimensional imaging systems that may overcome some of the above-mentioned limitations of a conventional three-dimensional imaging system.

Figure 2:
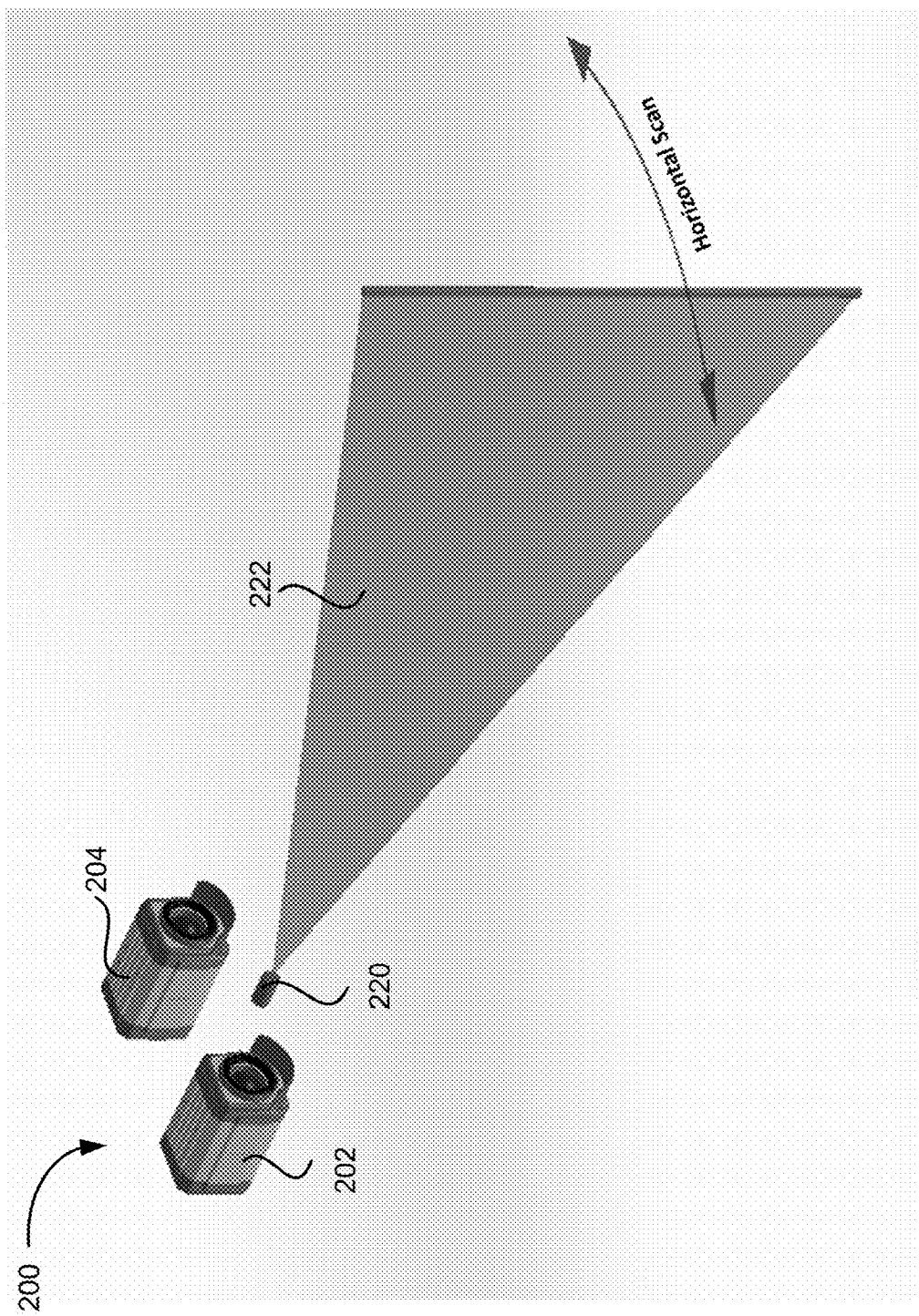
FIG. 2 illustrates schematically a three-dimensional imaging system according to an embodiment of the present invention.

FIG. 2 illustrates schematically a three-dimensional imaging system 200 for three-dimensional (3D) sensing according to an embodiment of the present invention. The three-dimensional imaging system 200 includes a first camera 202 and a second camera 204 displaced horizontally from one another. The three-dimensional imaging system 200 further includes an illumination source 220 configured to project a vertical fan of light 222 toward the scene in front of the two cameras 202 and 204. In some embodiments, the illumination source 220 may comprise a laser source configured to emit a laser beam, and an optical element, such as a cylindrical lens, configured to convert the laser beam into the vertical fan of light 222. The vertical fan of light 222 may form an illumination line on an object as it strikes the object. By comparing the images of the illumination line formed on the two cameras 202 and 204, the depth information about the object from the three-dimensional imaging system 200 may be determined in the same fashion as in a conventional three-dimensional imaging system. An advantage of three-dimensional imaging system 200 as compared to a conventional three-dimensional imaging system is that the illumination line serves as both the illumination and the feature for the cameras to detect, thus it can perform 3D sensing of objects even if the objects are feature-less and are under poor natural illumination.

The illumination source 220 may further include a scanning mechanism configured to scan the vertical fan of light 222 in the horizontal direction. In some embodiments, the scanning mechanism may comprise a scanning mirror or a rotating mirror. A flexure bearing or rotating bearing can be used for scanning the mirror. The flexure bearing or rotating bearing can be driven by a piezoelectric element, a voice coil actuator, or an electric motor according to various embodiments. In another embodiment, the scanning mechanism may comprise an acoustic optical deflector.

As the vertical fan of light 222 scans across the field of view, the cameras 202 and 204 may capture snap shots of the illumination line at a suitable frame rate, so that distance information about objects in the field of view may be obtained. The frame rate of the cameras may be set for a desired horizontal spatial resolution and a desired detection rate. For example, the frame rate may range from about 30 frames per second to about 1,000 frames per second, while the illumination scan rate may range from about 1 sweep per second to about 20 sweeps per second. The horizontal resolution and frame rate for a complete image depends on the scan rate of the illumination as well as the camera frame rate. For example, if the camera frame rate is 1,000 frames per second, and the illumination scans from one side of the image to the other at a rate of 5 sweeps per second, then each image will have 200 horizontal pixels, and the image rate will be 5 images per second. In one embodiment, in order to improve the image rate and reduce mechanical scan requirements, one image may be taken as the fan of light 222 scans from left to right, and the next image can be taken as the fan of light 222 scans back from right to left.

According to another embodiment, a three-dimensional imaging system may include only one camera, instead of two cameras as illustrated in FIG. 2. As long as the axis of the camera is offset from the axis of the illumination source in the horizontal direction by a baseline distance, depth information about the objects in the field of view may be obtained from the distortions of the illumination line in the images based on a prior calibration using a known object.

In another embodiment, the illumination source may be configured to project a horizontal fan of light onto the objects in front of the cameras. The horizontal fan of line may be scanned in the vertical direction for 3D sensing the objects. In other embodiments, the fan of light can be in other angles different from the horizontal or vertical. One of ordinary skill in the art would recognize many variations, alternatives, and modifications.

Figure 3:
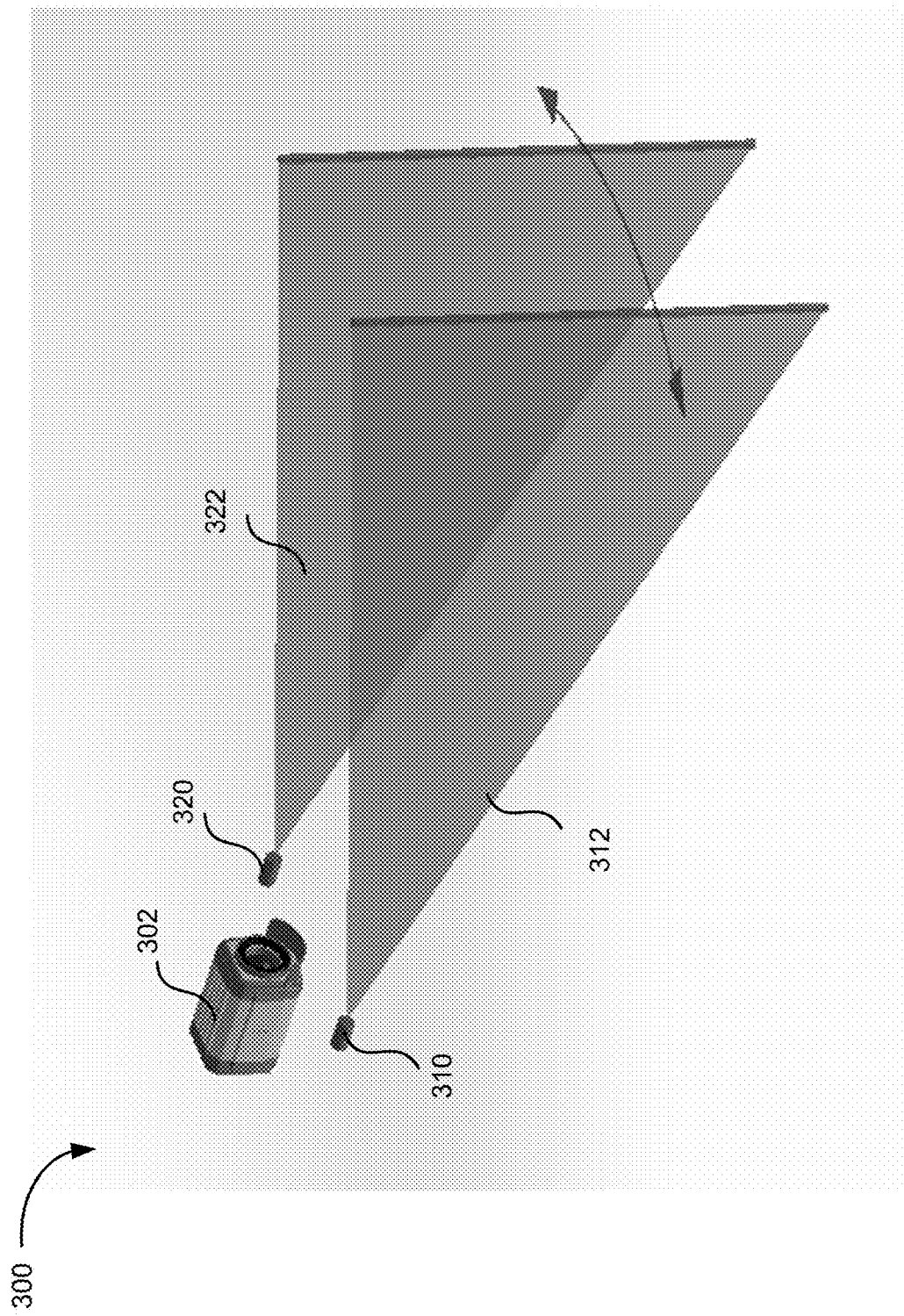
FIG. 3 illustrates a three-dimensional imaging system according to another embodiment of the present invention.

FIG. 3 illustrates a three-dimensional imaging system 300 according to another embodiment of the present invention. The three-dimensional imaging system 300 includes one camera 302 and two illumination sources 310 and 320. The two illumination sources 310 and 320 are configured to project two vertical fans of light 312 and 322. The two vertical fans of light 312 and 322 may be adjusted to be parallel to each other. The three-dimensional imaging system 300 may further include a scanning mechanism configured to scan the two vertical fans of light 312 and 322 in a horizontal direction simultaneously and synchronously. The scan mechanism may comprise a scanning mirror or a rotating mirror, or an acoustic optical deflector, according to various embodiments of the present invention.

The spatial resolution in the x-y plane and the depth accuracy (i.e., accuracy in the z direction) may depend on the spacing between the two vertical fans of light 312 and 322. In general, the farther apart from each other the two fans of light 312 and 322 are, the better depth accuracy, but worse resolution in the x-y plane. In some embodiments, the spacing between the two fans of light 312 and 322 may be configured to be from about two inches to about two feet. In one embodiment, the spacing is preferably about 18 inches. The three-dimensional imaging system 300 may afford higher depth accuracy as compared to the three-dimensional imaging system 200 illustrated in FIG. 2.

Figure 4:
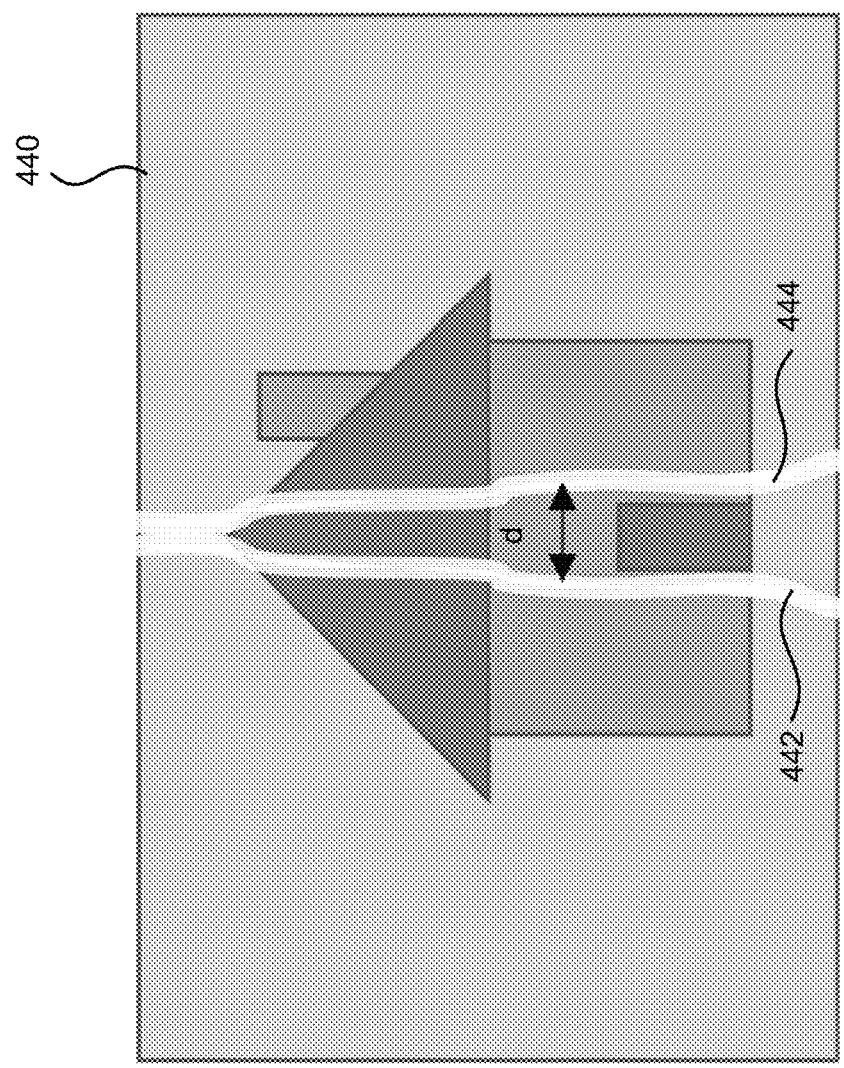
FIG. 4 illustrates schematically an image of an object (e.g., a house) that may be captured by the camera of the three-dimensional imaging system illustrated in FIG. 3 according to an embodiment of the present invention.

FIG. 4 illustrates schematically an image 440 of an object (e.g., a house) that may be captured by the camera 302 of the three-dimensional imaging system 300. The two vertical fans of light 312 and 322 may project two illumination lines 442 and 444 on the object. The distance d between the two illumination lines 442 and 444 in the image 440 may depend on the distance from the object to the camera 302. In general, the distance d between the two illumination lines 442 and 444 in the image 440 is inversely proportional to the distance from the object to the camera 302. That is, the closer the two illumination lines 442 and 444 appear from each other in the image 440, the farther the object is from the camera 302. The two illumination lines 442 and 444 in the image 440 may merge together for an object at infinity, which is the vanishing point in projection geometry. Thus, depth information about various points on the object may be determined from a series of images of the object as the two vertical fans of light 312 and 322 are scanned across the object plane.

Figure 5:
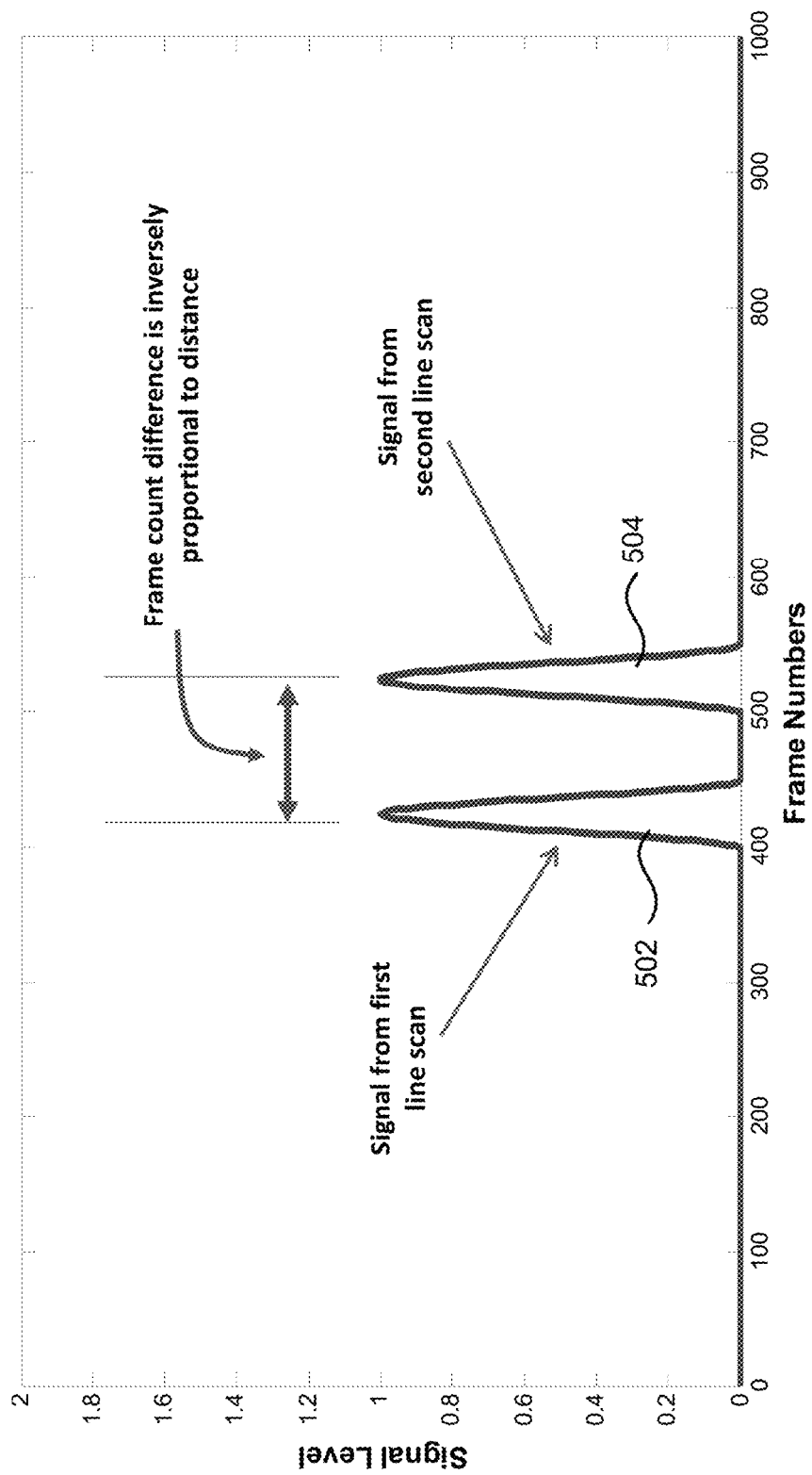
FIG. 5 shows a schematic plot of the light intensity at a pixel of an image sensor as a function of frame number according to an embodiment of the present invention.

In an alternative embodiment, depth information may be extracted in the following manner. As the two vertical fans of light 312 and 322 are scanned in a horizontal direction, the light intensity of a single pixel in the image 440 may be monitored in a series of consecutive frames. FIG. 5 shows a schematic plot of the light intensity at a pixel as a function of frame number according to an embodiment of the present invention. As the two vertical fans of light 312 and 322 are sequentially scanned across an object point corresponding to that pixel, two intensity peaks 502 and 504 may appear in the intensity plot at two different frame numbers. For a constant velocity scan, the time difference between the two intensity peaks 502 and 504 is inversely proportional to the distance from that object point to the camera 302. In one embodiment, the time difference may be determined by multiplying the number of frames between the two intensity peaks 502 and 504 by the frame rate of the camera.

The three-dimensional imaging system 300 illustrated in FIG. 3 may afford several advantages as compared to the conventional three-dimensional imaging system. In a conventional three-dimensional imaging system that requires two cameras, such as the three-dimensional imaging system illustrated in FIG. 1, the variation in the baseline distance D between the two cameras may be a major source of error, especially in an automotive environment where the temperature variation can reach over 100° C. In contrast, the three-dimensional imaging system 300 illustrated in FIG. 3 requires only one camera; therefore the requirement for the accuracy and the stability of the baseline distance D may be eliminated.

In the three-dimensional imaging system 300, the distances between the two illumination sources 310 and 320, as well as the distances between each of the two illumination sources 310 and 320 and the camera 302, are not critical as long as the two fans of light 312 and 322 are kept parallel to each other. It may be easier to control the parallelism of the two fans of light 312 and 322 than to control the absolute baseline distance D. For example, two predefined parallel surfaces of a piece of metal or glass may remain parallel in a large temperature variation while the body size may change significantly. In addition, unlike the baseline distance variation, the parallelism can be easily measured in-situ to provide a feedback to the control software for real time correction. Therefore, the three-dimensional imaging system 300 may afford better accuracy and stability for long distance measurement as compared to a conventional three-dimensional imaging system.

Figure 6:
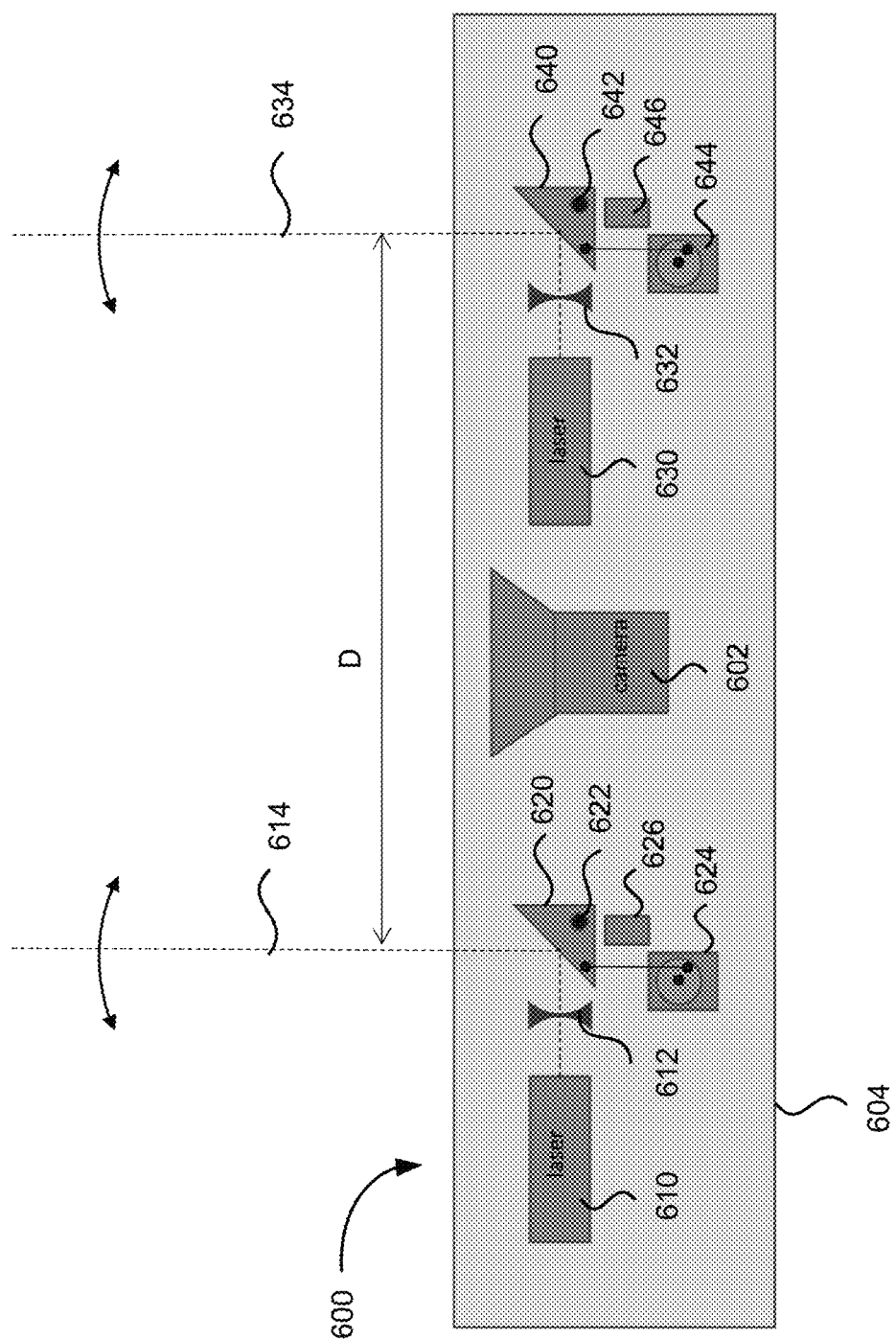
FIG. 6 illustrates schematically a three-dimensional imaging system using scanning mirrors according to an embodiment of the present invention.

FIG. 6 illustrates schematically a three-dimensional imaging system 600 using scanning mirrors according to an embodiment of the present invention. The three-dimensional imaging system 600 includes a camera 602, a first laser source 610, and a second laser source 630 mounted in a housing 604. The first laser source 610 and the second laser source 630 may be configured to emit a first collimated laser beam and a second collimated laser beam, respectively. The three-dimensional imaging system 600 further includes a first optical element 612, such as a cylindrical lens, configured to expand the first laser beam in the vertical direction to form a first vertical fan of light 614. The three-dimensional imaging system 600 further includes a first mirror 620 configured to reflect the first vertical fan of light 614 toward the objects in front of the camera 602. The three-dimensional imaging system 600 further includes a second optical element 632 configured to expand the second laser beam emitted by the second laser source 630 to form a second vertical fan of light 634, and a second mirror 640 configured to reflect the second vertical fan of light 634 toward the objects in front of the camera 602.

In some embodiments, the first mirror 620 is further configured to oscillate about a pivot axis 622, so as to scan the first fan of light 614 in the horizontal direction as indicated by the arrow. Similarly, the second mirror 640 is further configured to oscillate about the pivot axis 642, so as to scan the second fan of light 634 in the horizontal direction as indicated by the arrow. In one embodiment, the first mirror 620 and the second mirror 640 may be mechanically driven by a first motor 624 and a second motor 644, respectively. In one embodiment, the three-dimensional imaging system 600 may further include a first encoder 626 and a second encoder 646 for measuring the rotational angles of the first mirror 620 and the second mirror 640, respectively. In some embodiments, the first encoder 626 and the second encoder 646 may send feedback signals to a processor, so that the processor may send control signals to the first motor 624 and the second motor 644 to ensure that the first mirror 620 and the second mirror 640 are scanned synchronously.

In some embodiments, the first fan of light 614 and the second fan of light 634 may be scanned with an angular speed ranging from about 100 degrees per second to about 1,000 degrees per second. The first fan of light 614 may generate a first illumination line on an object as it strikes the object, and the second fan of light 634 may generate a second illumination line on the object as it strikes the object. The camera 602 may be configured to captures images of the first illumination line and the second illumination line at a frame rate ranging from about 60 frames per second to about 1,000 frames per second. Each image may capture a "snap shot" of the two first illumination line and the second illumination line as the first fan of light 614 and the second fan of light 634 strike a corresponding region of the object. The distance from the camera 602 to the corresponding region of the object may be determined from the distance between the first illumination line and the second illumination line in the image. In this fashion, from a series of "snap shots" captured by the camera 602 as the first fan of light 614 and the second fan of light 634 are scanned across the object, a three-dimensional image of the object may be constructed. Alternatively, the distance from the camera 602 to the corresponding region of the object may be determined by measuring the time delay between the detection of the first illumination line and the detection of the second illumination line in a corresponding pixel of the image as described above with reference to FIG. 5. By measuring the time delay for all pixels in the image as the first fan of light 614 and the second fan of light 634 are scanned across the object, a three-dimensional image of the object may be constructed.

According to some embodiments of the present invention, each of the first motor 624 and the second motor 644 may comprise a voice coil motor, a stepper motor, or servo motor. In one embodiment, each of the first motor 624 and the second motor 644 may comprise a rotating motor driving a cam coupled to each of the first mirror 620 and the second mirror 640, respectively.

In another embodiment, instead of using oscillating mirrors, the three-dimensional imaging system 600 may use two acoustic optical deflectors to electronically scan the first vertical fan of light 614 and the second vertical fan of light 634. In yet another embodiment, the three-dimensional imaging system 600 may use two rotating polygonal mirrors to scan the first vertical fan of light 614 and the second vertical fan of light 634. Each of the polygonal mirrors may be driven by a conventional motor, a servo motor, or a stepper motor according to various embodiments.

In a further embodiment, each of the first laser source 610 and the second laser source 630, together with the first optical element 612 and the second optical element 632, may be configured to be scanned in a horizontal direction. In one embodiment, the first mirror 620 and the second mirror 640 may not be required, depending on how the optics are configured. In another embodiment, each of the first mirror 620 and the second mirror 640 may comprise a cylindrical reflecting surface configured to expand the laser beam emitted by the first laser source 610 or the second laser source 630 in the vertical direction to form a vertical fan of light. In this case, the first optical element 612 and the second optical element 632 may be omitted. In another embodiment, the three-dimensional imaging system 600 may include a single laser source instead of two separate laser sources. In this case, the three-dimensional imaging system 600 may further include a beam-splitter to split a laser beam emitted by the single laser source into two laser beams.

Figure 7:
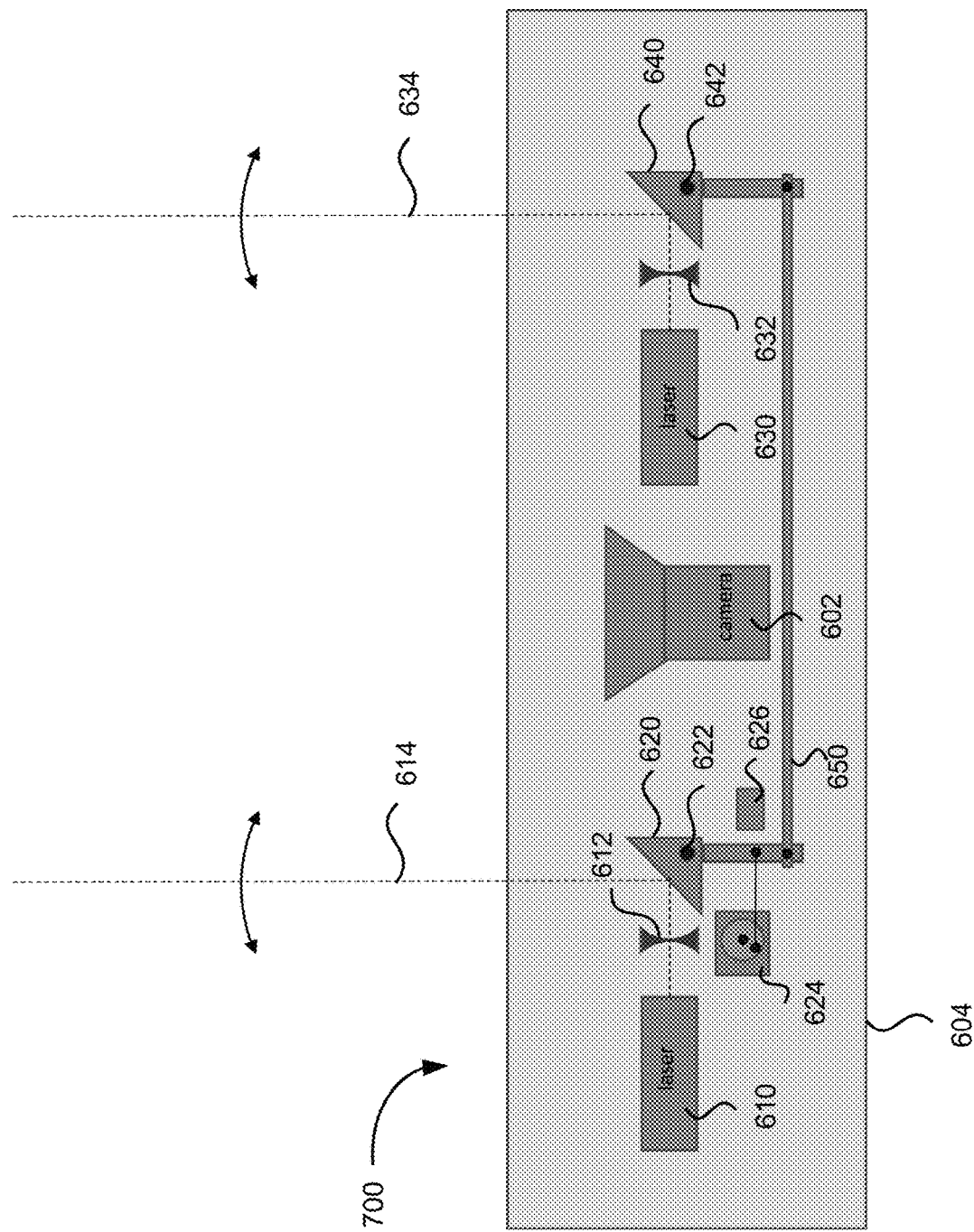
FIG. 7 illustrates schematically a three-dimensional imaging system using scanning mirrors according to another embodiment of the present invention.

FIG. 7 illustrates schematically a three-dimensional imaging system 700 using scanning mirrors according to another embodiment of the present invention. Similar to the three-dimensional imaging system 600 illustrated in FIG. 6, the three-dimensional imaging system 700 also includes a camera 602, a first laser source 610 and a second laser source 630 configured to emit a first laser beam and a second laser beam, respectively, a first optical element 612 and a second optical element 632 configured to expand the first laser beam and the second laser beam into a first vertical fan of light 614 and a second vertical fan of light 634, respectively, and a first mirror 620 and a second mirror 640 configured to reflect the first vertical fan of light 614 and the second vertical fan of light 634, respectively, toward a scene in front of the camera 602. The three-dimensional imaging system 700 further includes a linking assembly 650 that mechanically links the first mirror 620 and the second mirror 640. In one embodiment, the linking assembly 650 includes a first rod attached to the first mirror 620, a second rod attached to the second mirror 640, and a cross bar attached to the first rod and the second rod. Instead of having two motors, the three-dimensional imaging system 700 may include a single motor 624 configured to drive both the first mirror 620 and the second mirror 640 through the linking assembly. The linking assembly 650 ensures that the first mirror 620 and the second mirror 640 are properly aligned with respect to each other and are scanned synchronously. The three-dimensional imaging system 700 may include a single encoder 626 for measuring the rotation angle of the first mirror 620 or the rotation angle of the second mirror 640.

Figure 8:
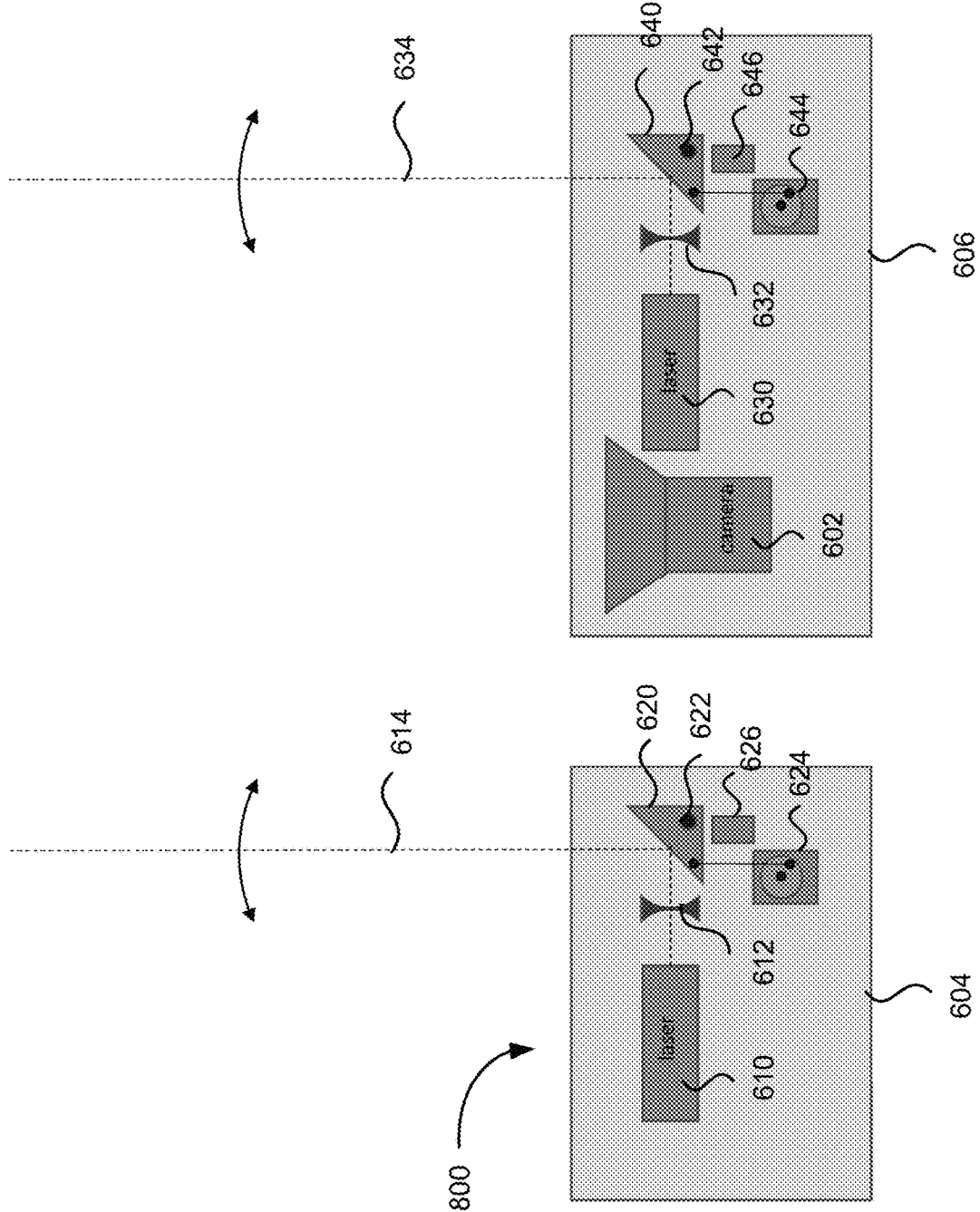
FIG. 8 illustrates a three-dimensional imaging system according to another embodiment of the present invention.

FIG. 8 illustrates a three-dimensional imaging system 800 according to another embodiment of the present invention. The three-dimensional imaging system 800 is similar to the three-dimensional imaging system 600, except that the two illumination sources are placed in two separate housings 604 and 606. That is, the first laser source 610, the first optical element 612, the first mirror 620, the first motor 624, and the first encoder 626 are placed in the first housing 604; and the second laser source 630, the second optical element 632, the second mirror 640, the second motor 644, and the second encoder 646 are placed in the second housing 606. In some embodiments, the camera 602 may be placed in either the first housing 604 or the second housing 606. In another embodiment, the camera 602 may be placed in another separate housing. By placing the two illumination sources in separate housings, it may be easier to vary the distance between the two fans of light 614 and 634 for possible trade-offs between resolution and detection range without redesigning the entire system. It may also be easier to mount the three-dimensional imaging system 800 in space-constrained areas, such as in the bumper of an autonomous vehicle.

According to some embodiments of the present invention, the requirement that the two fans of light be precisely parallel to each other may be relaxed by calibrating 3D images of an object against a 3D target image of the object. For example, a 3D target image of the object can be acquired by using a time-of-flight (TOF) lidar system. A 3D image of the object acquired by the three-dimensional imaging system 600, 700, or 800 as illustrated in FIGS. 6-8 may then be compared against the 3D target image to generate a set of calibration coefficients. The set of calibration coefficients may include, for example, translation, rotation, and scaling coefficients, that can be applied to the 3D image acquired by the three-dimensional imaging system in order to match with the 3D target image. In one embodiment, the calibration can be done in real time. In another embodiment, the calibration may be performed beforehand, and the calibration coefficients may be stored and used by a control software. By relaxing the parallelism requirement, more flexibility in the design of the mounting system may be achieved. For example, each illumination source may be mounted individually, and the camera may be mounted separately from the illumination sources. For instance, when applied for obstacle detection in an autonomous vehicle, the two illumination sources may be mounted in the headlight fixtures of the vehicle.

Figure 9:
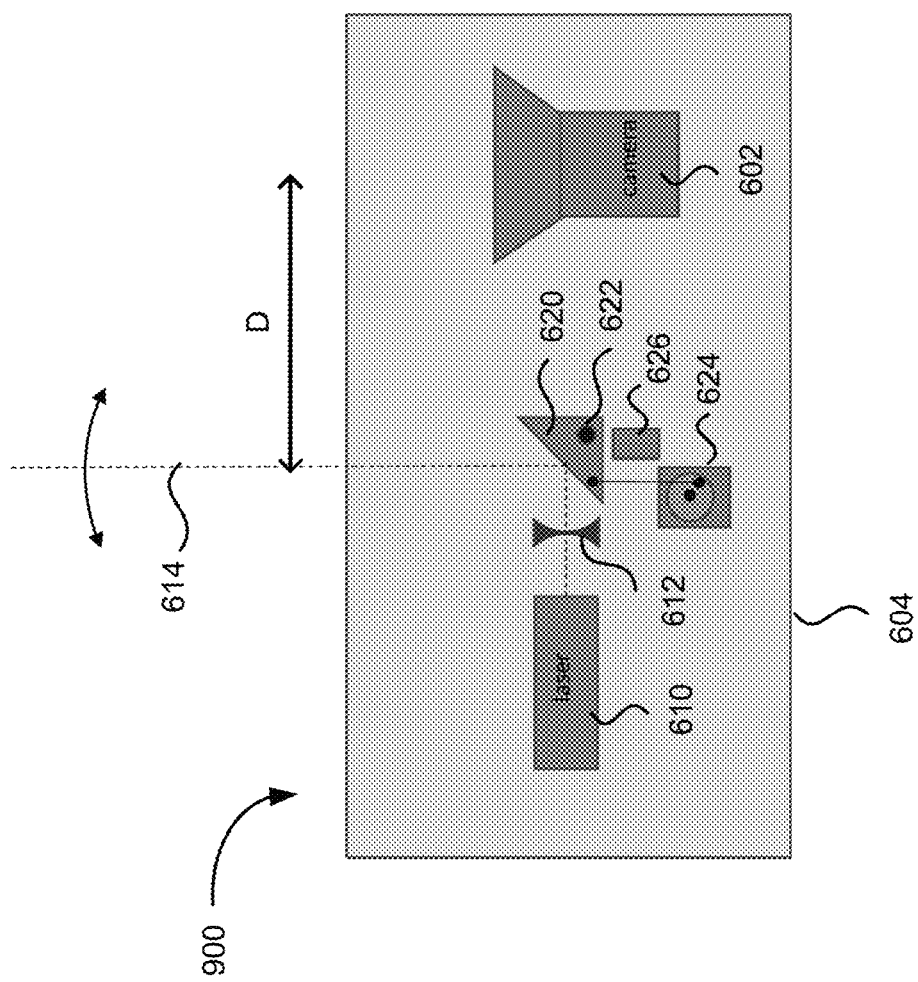
FIG. 9 illustrates a three-dimensional imaging system according to another embodiment of the present invention.

FIG. 9 illustrates a three-dimensional imaging system 900 according to another embodiment of the present invention. The three-dimensional imaging system 900 includes only one illumination source that may comprise a laser source 610, an optical element 612, a mirror 620, a motor 624, and an encoder 626. The three-dimensional imaging system 900 further includes a camera 602. The illumination source projects a fan of light 614 toward an object in the camera's field of view. The fan of light 614 may form an illumination line on the object as it strikes the object. In this configuration, object distance may be determined by the distortion in the position of the illumination line as seen in an image captured by the camera 602 based on a prior calibration using a known object. The amount of distortion may depend on the baseline distance D between the axis of the camera 602 and the illumination axis.

In some embodiments, the illumination source is configured to scan the fan of light 614 across the field of view at a rate ranging from about 1 sweep per second to about 20 sweeps per second, such that the three-dimensional imaging system 900 operates at an image rate ranging from about 1 image per second to about 20 images per second. As described above, the lateral resolution may depend on both the scan rate of the illumination source and the frame rate of the camera 602.

Figure 10:
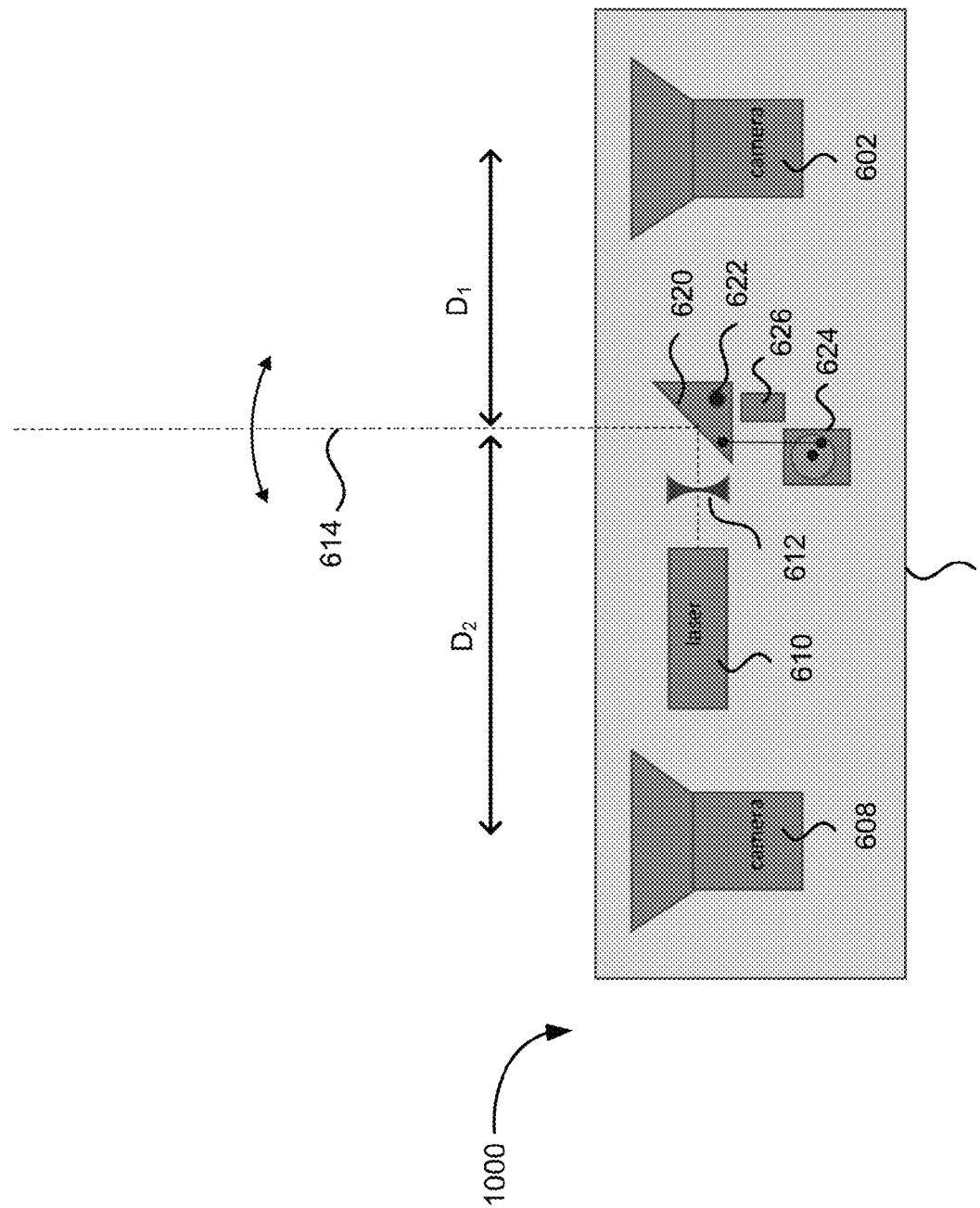
FIG. 10 illustrates a three-dimensional imaging system according to yet another embodiment of the present invention.

FIG. 10 illustrates a three-dimensional imaging system 1000 according to yet another embodiment of the present invention. The three-dimensional imaging system 1000 is similar to the three-dimensional imaging system 900 illustrated in FIG. 9, except that it includes a second camera 608 disposed on the opposite side of the illumination source from the first camera 602. For an object that is relatively far away or is partially hidden behind another object, the view of the illumination line by one camera may be blocked. Adding a second camera on the opposite side of the illumination source may help ensure that at least one camera has a clear line-of-sight visibility of the illuminated line. In one embodiment, a first baseline distance $D_1$ between the axis of the first camera and the illumination axis may be chosen to be different from a second baseline distance $D_2$ between the axis of the second camera and the illumination axis, such that one camera is optimized for optimal depth resolution for closer objects, and the other camera is optimized for long-range detection.

Figure 11:
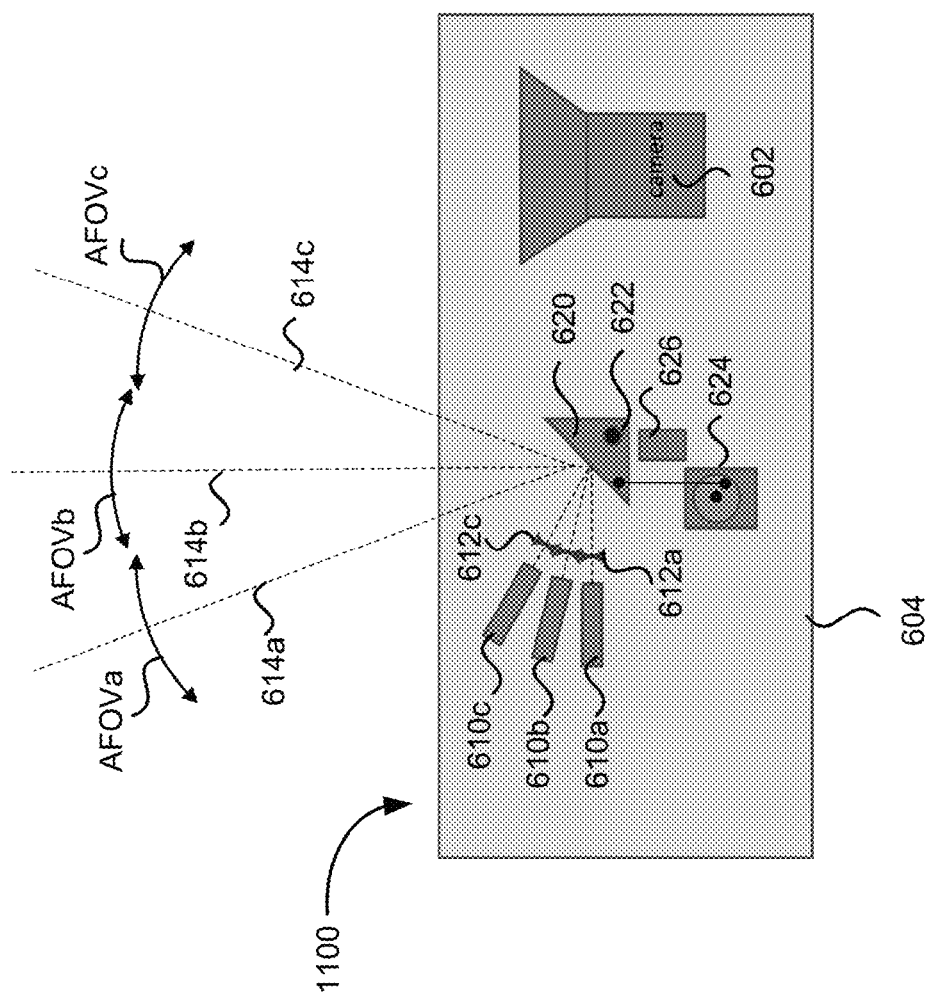
FIG. 11 illustrates a three-dimensional imaging system according to another embodiment of the present invention.

FIG. 11 illustrates a three-dimensional imaging system 1100 according to another embodiment of the present invention. The three-dimensional imaging system 1100 is similar to the three-dimensional imaging system 900 illustrated in FIG. 9, except that it includes three laser sources 610*a*-610*c* and three optical elements 612*a*-612*c* for expanding the laser beams emitted by the laser sources 610*a*-610*c* into three vertical fans of light 614*a*-614*c*, respectively. In this configuration, the scan range of the mirror 620 may give rise to a certain angular field of view AFOVa, AFOVb, or AFOVc for each fan of light. The total angular field view TAFOV may be the sum of the angular field view of the three individual fans of light AFOVa, AFOVb, and AFOVc. For example, the angular field of view AFOVa, AFOVb, or AFOVc for each individual fan of light may be about 30 degrees, and the total angular field of view TAFOV may be about 90 degrees. Thus, a relatively small scan range of the mirror 620 may give rise to a relatively large total field of view (e.g., 90 degrees or greater). According to various embodiments, the angular field of view of the adjacent fans of light may abut each other, or may partially overlap with each other.

The three-dimensional imaging system 1100 illustrated in FIG. 11 may afford several advantages. For example, the relatively small scan range of the mirror 620 may simplify the mechanical design and afford better reliability. In addition, it may also increase the overall frame rate of the system for a given mechanical scan speed. In other embodiments, fewer or more laser sources, for example 2 or 4 laser sources may be used. In some alternative embodiments, instead of using multiple laser sources, multiple fans of light may be generated using a beam splitter, a diffractive optical element, a mirror with multiple facets, or the like. This approach may also be implemented in other embodiments of the present invention. For example, for the three-dimensional imaging system 600, 700, 800 illustrated in FIGS. 6-8, instead of a single pair of fans of light, multiple pairs of fans of light may be generated, each pair covering a respective portion of the total angular field of view. It may also be implemented in the three-dimensional imaging system 1000 illustrated in FIG. 10.

In some embodiments, the laser source(s) used in the three-dimensional imaging systems 600, 700, 800, 900, 1000, and 1100 as illustrated in FIGS. 6-11 may be configured to emit laser beams in the infrared (IR) wavelength range (e.g., 0.75 µm-1000 µm). In some embodiments, the first laser source 610 and the second laser source 630 may be configured to emit laser beams in the near infrared (NIR) wavelength range (e.g., 0.75 µm-1.4 µm), or in the short-wavelength infrared (e.g., 1.4 µm-3 µm), or in the mid-wavelength infrared wavelength range (e.g., 3 µm-8 µm). For laser sources operating in wavelengths greater than about 1.5 µm, the energy levels could be higher as the eye does not focus at those wavelengths.

One performance issue associated with a three-dimensional imaging system is ambient light control. Ambient light, especially light pollution from sun light, may saturate the camera. In order to reject most ambient light and thus improve the dynamic range and the signal-to-noise ratio, a narrow-band filter can be used in front of the camera in conjunction with narrow band light sources, such as laser sources. For example, a multi-layer thin-film filter may be designed to have a narrow transmission band in the infrared wavelength range of the laser sources, and have high reflectance for all other wavelengths. For most multi-layer thin-film type narrow-band filters, however, the center wavelength of the transmission band is usually sensitive to the incidence angle. Thus, for a camera that takes images from a large angular field of view, the center wavelength of the filter may shift as light incident on the filter at different angles. The solutions discussed below may address this problem.

Figure 12:
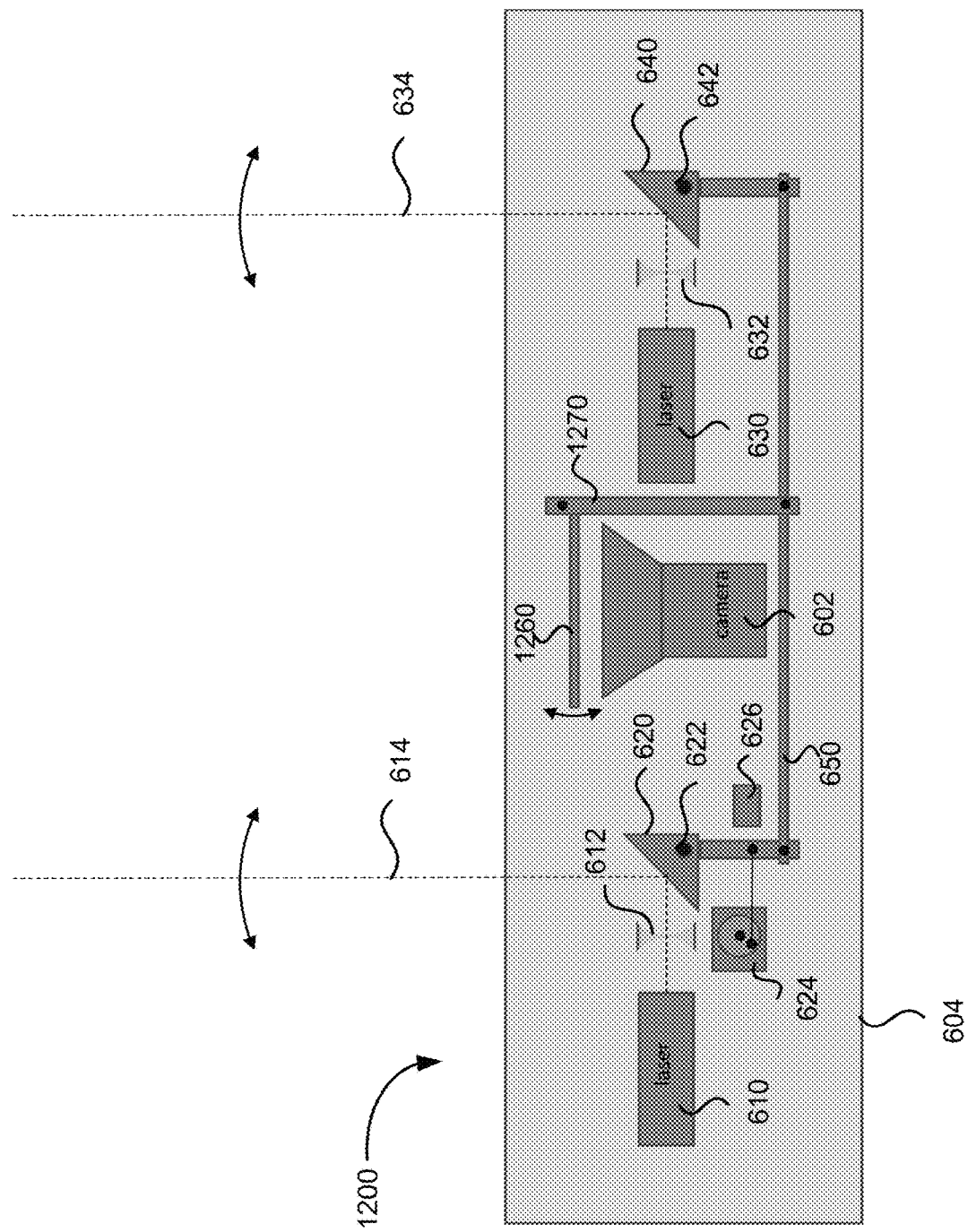
FIG. 12 illustrates a three-dimensional imaging system that includes a scanning filter according to an embodiment of the present invention.

FIG. 12 illustrates a three-dimensional imaging system 1200 that includes a scanning filter 1260 according to an embodiment of the present invention. The three-dimensional imaging system 1200 is similar to the three-dimensional imaging system 700 illustrated in FIG. 7, which includes a camera 602, two laser sources 610 and 630, two mirrors 620 and 640, and a scanning assembly 650 connecting the two mirrors 620 and 640 for scanning the two mirrors 620 and 640 synchronously. The three-dimensional imaging system 1200 further includes a narrow-band filter 1260 disposed in front of the camera 602. The narrow-band filter 1260 may be configured to be scanned synchronously with the scanning of the two mirrors 620 and 640, such that the laser light always incident on the filter 1260 at a constant angle. Note that this is only possible for a scanning illumination, as is the case for the three-dimensional imaging systems 600, 700, 800, 900, 1000, and 1100 as illustrated in FIGS. 6-11. If global illumination is used where the entire field of view is illuminated simultaneously, scanning of the filter 1260 will not eliminate the variation of incidence angles.

Synchronization of the scanning of the filter 1260 with the scanning of the mirrors 620 and 640 may be accomplished mechanically or electronically. In the case where the mirrors 620 and 640 are mechanically scanned, the ratio of the scanning speed for the filter 1260 and the scanning speed of mirror should be about 2:1, as a one-degree change in the mirror angle results in a two-degree change in the angle of incidence. In one embodiment, the filter 1260 may be coupled to the scanning assembly 650 via a mechanical bar 1270, so that the motor 604 drives the scanning of the mirrors 620 and 640 as well as the scanning of the filter 1260.

According to another embodiment of the present invention, a lock-in detection technique may be used for ambient light rejection. For example, the laser beams emitted by the laser sources 610 and 630 may be modulated at a specific frequency, and the camera 602 may be configured to detect light at the same frequency in order to reject other signals. In one embodiment, in the three-dimensional imaging systems 600, 700, 800, 900, 1000, and 1100 as illustrated in FIGS. 6-11, the camera 602 may be operated with a trigger signal synchronized to the modulation frequency of the illumination signals.

According to yet another embodiment, the camera 602 may be configured to take one image with illumination on and another image with illumination off. The difference image may eliminate the background signals.

Figure 13:
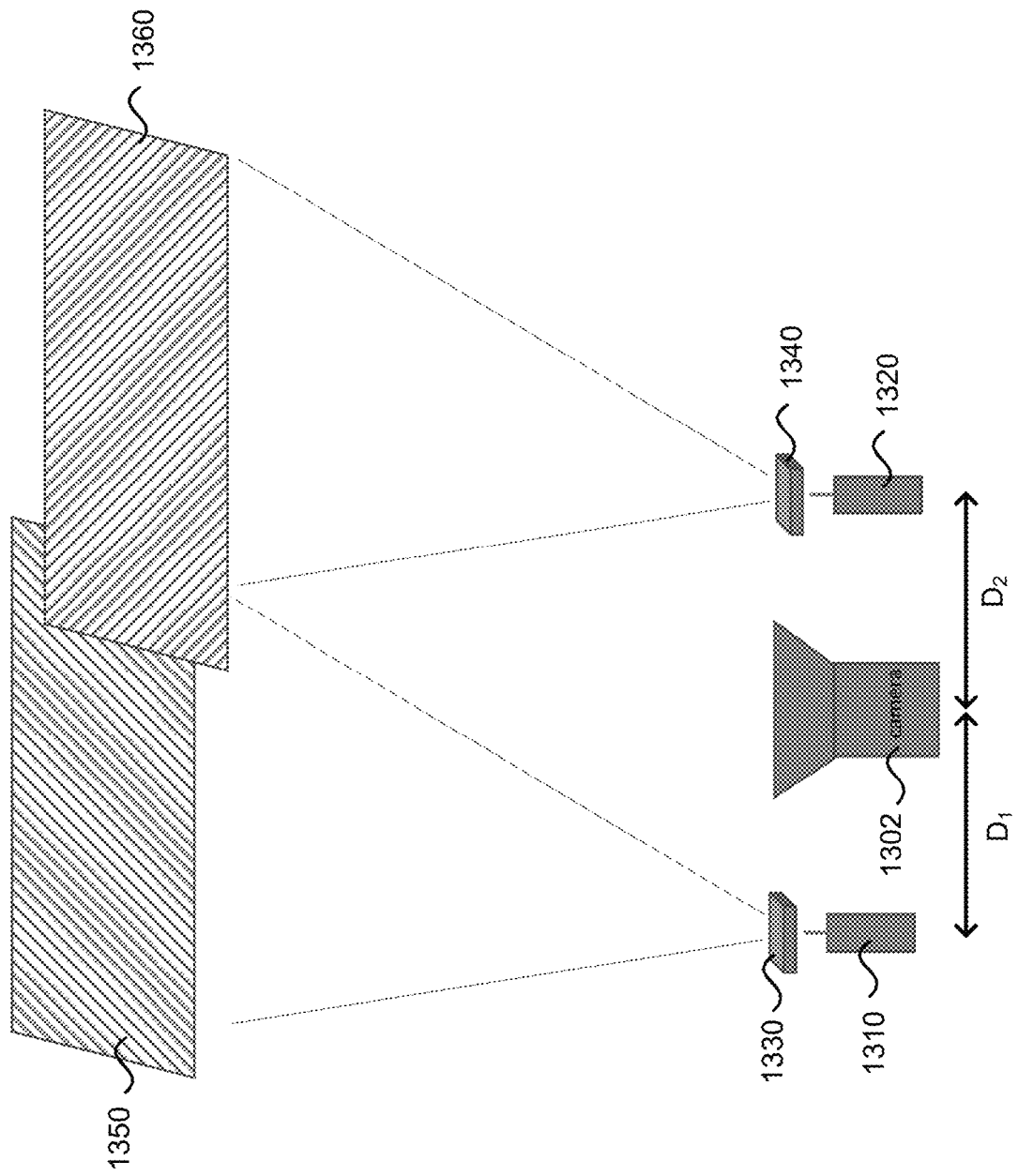
FIG. 13 illustrates schematically a three-dimensional imaging system using structured illumination according to an embodiment of the present invention.

FIG. 13 illustrates schematically a three-dimensional imaging system 1300 using structured illumination according to an embodiment of the present invention. The three-dimensional imaging system 1300 includes a camera 1302, a first laser source 1310, and a second laser source 1320. The three-dimensional imaging system 1300 further includes a first diffractive optical element 1330 and a second diffractive optical element 1340. The first diffractive optical element 1330 is disposed in front of the first laser source 1310 and configured to convert a laser beam emitted by the first laser source 1310 into a first structured (patterned) illumination 1350 projected at the field of view in front of the camera 1302. The second diffractive optical element 1340 is disposed in front of the second laser source 1320 and configured to convert a laser beam emitted by the second laser source 1320 into a second structured illumination 1360. According to various embodiments, each of the first structured illumination 1350 and the second structured illumination 1360 can be a grid pattern, vertical lines, horizontal lines, and the like. The first structured illumination 1350 and the second structured illumination 1360 may have different uniquely identifiable patterns. As such, the system can be cross-calibrated against the two different illumination patterns.

The two laser sources 1310 and 1320 may be separated by a fixed baseline distance. The camera 1302 may be optimally placed in between the two laser sources 1310 and 1320, so that the camera 1302 is separated from the first laser source 1310 by a first fixed baseline distance $D_1$, and from the second laser source 1320 by a second fixed baseline distance $D_2$. Similar to the three-dimensional imaging systems 600, 700, and 800 illustrated in FIGS. 6-8, the apparent distance between illumination points from the two laser sources 1310 and 1320 as seen in an image captured by the camera 1302 may be used to determine the distance of an object in the field of view. Alternatively, the distortion of the pattern may be used to determine distance information. In some embodiments, different baseline distances may be chosen for $D_1$ and $D_2$. For example, one baseline distance may be optimized for good distance resolution for closer objects, and the other baseline distance may be optimized for long-range detection.

The first structured illumination 1350 and the second structured illumination 1360 may be made distinguishable in a number of ways. For instance, one may be horizontal lines, and the other vertical lines. Alternatively, they may be both grid patterns, but the patterns are offset so that one grid falls into the gaps of the other grid. In one embodiment, the two laser sources 1310 and 1320 can be modulated, alternately flashing in synchronicity with the camera frame rate to provide a high degree of separation and allow lock-in detection for background rejection. In another embodiment, the two laser sources 1310 and 1320 may be configured to operate in different wavelength ranges. The camera 1302 may use narrow-band filters to discriminate between the two illumination wavelength ranges.

In a further embodiment, two cameras may be used, each with a different narrow-band filter. For example, the filter for one camera may be tuned to the wavelength range of the first laser source 1310, and the filter for the other camera may be tuned to the wavelength range of the second laser source 1320. In some embodiments, the illuminations 1350 and 1360 may be fixed, or scanned to allow a larger field of view or finer resolution. The two cameras can be used to further improve calibration by checking the performance of one against the other. Using two cameras can also help prevent loss of data if part of an object is obscured from the view of one of the cameras.

Figure 14:
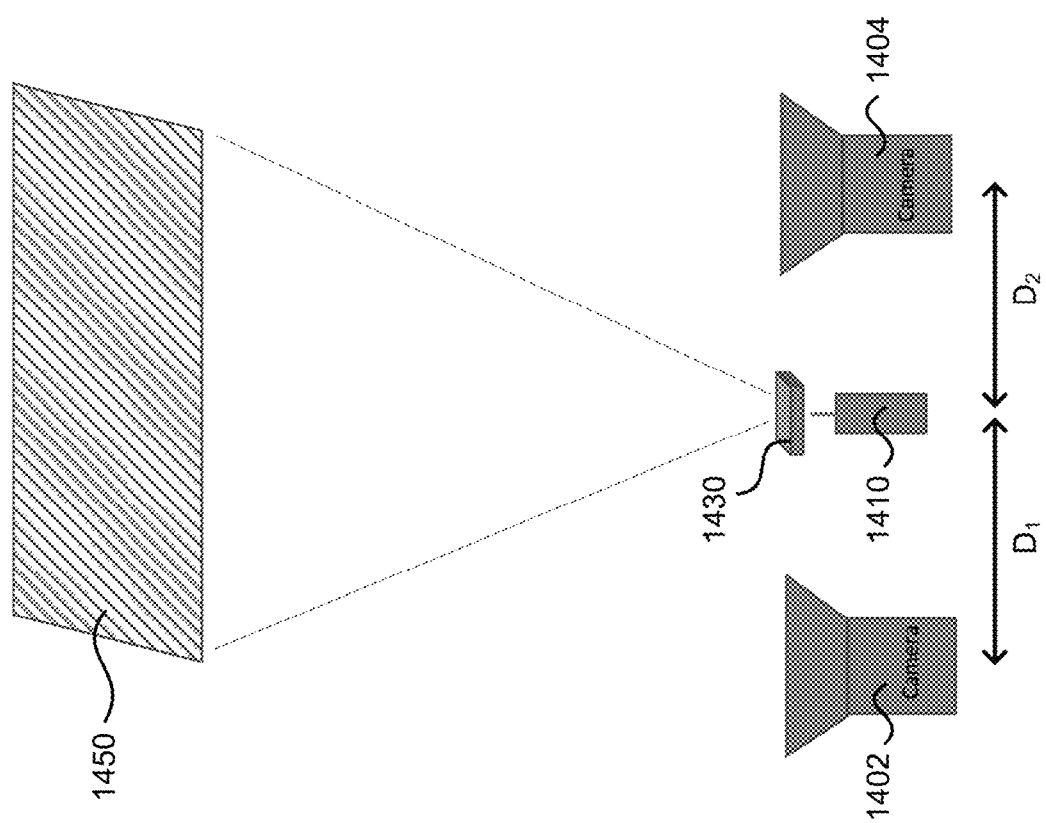
FIG. 14 illustrates a three-dimensional imaging system using structured illumination according another embodiment of the present invention.

FIG. 14 illustrates a three-dimensional imaging system 1400 using structured illumination according to another embodiment of the present invention. The three-dimensional imaging system 1400 includes a first camera 1402 and a second camera 1404, a single laser source 1410, and a diffractive optical element 1430 disposed in front of the laser source 1410 and configured to convert a laser beam emitted by the laser source 1410 into a structured illumination 1450 in the field of view of the two cameras 1402 and 1404. The first camera 1402 and the second camera 1404 are separated from each other at a fixed baseline distance. The laser source 1410 is preferably disposed between the first camera 1402 and the second camera 1404, so that it is separated from the first camera 1402 by a first baseline distance $D_1$, and from the second camera 1404 by a second baseline distance $D_2$.

Using two cameras instead of one may allow more robust performance in several ways. First, with a single camera, some portions of the light may be blocked by parallax error. For instance, one object may be partially hidden in a line of sight by another object in front it. With two cameras, while one object may be partially hidden from a line of sight of one camera, it may not be hidden from a line of sight of the other camera. Therefore, the chance that a part of the illumination being not visible may be reduced. Second, an image of one camera may be used to calibrate an image of the other camera, thus providing better distance accuracy and position accuracy. In some embodiments, a different baseline distance may be chosen for $D_1$ than $D_2$. For example, one baseline distance may be optimized for good distance resolution for closer objects, and the other baseline distance may be optimized for long-range detection.

Figure 15:
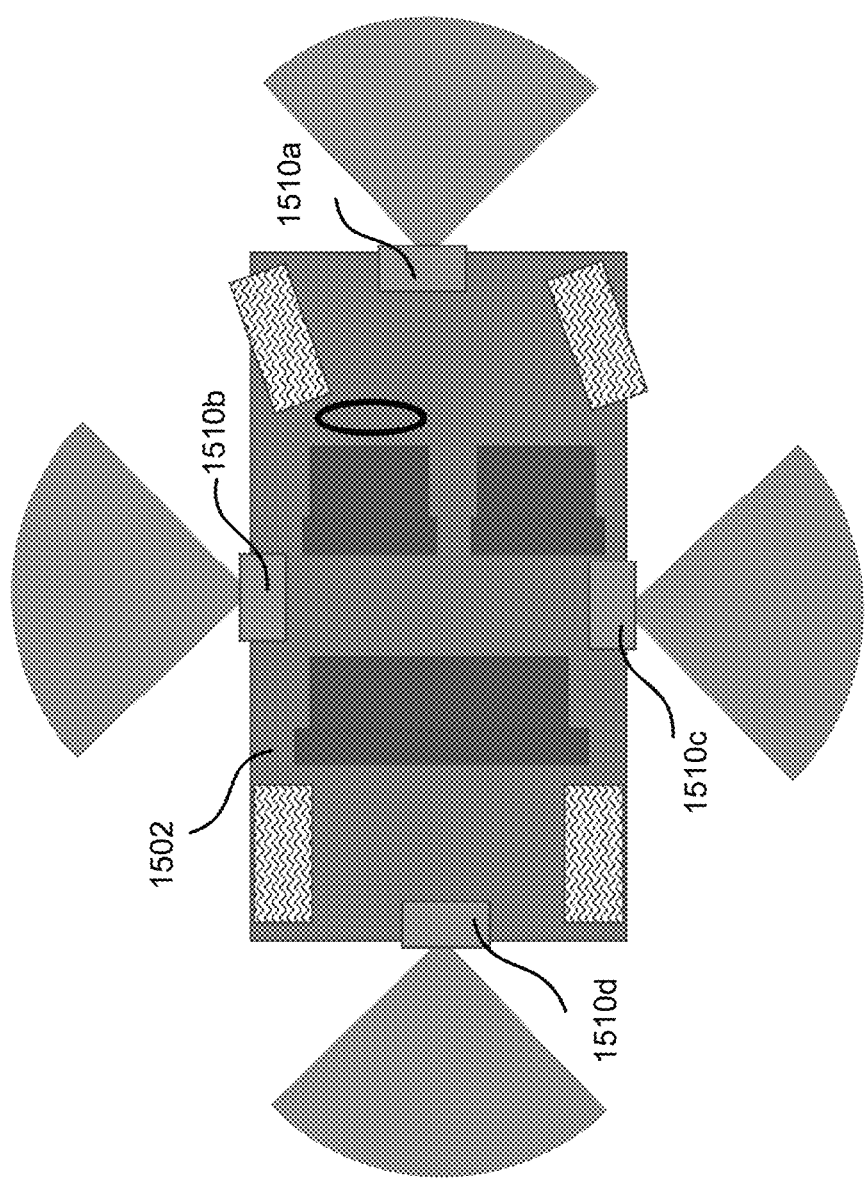
FIG. 15 illustrates schematically one or more three-dimensional imaging systems mounted on an autonomous or semi-autonomous vehicle for obstacle detection according to an embodiment of the present invention.

The three-dimensional imaging systems discussed above, such as the three-dimensional imaging systems illustrated in FIGS. 6-14, may be used in a number of applications. For example, they may be used in autonomous vehicles or drones for obstacle detection. FIG. 15 illustrates schematically one or more three-dimensional imaging systems 1510a-1510d mounted on an autonomous or semi-autonomous vehicle 1502 for obstacle detection according to an embodiment of the present invention. For example, a first three-dimensional imaging system 1510a may be mounted in the front side (e.g., a front bumper) of the vehicle 1502 for detecting objects in front of the vehicle 1502; a second three-dimensional imaging system 1510b and a third three-dimensional imaging system 1510c may be mounted on either side of the vehicle 1502 for detecting objects on the sides; and a fourth three-dimensional imaging system 1510d may be mounted on the rear (e.g., on a rear bumper) of the vehicle 1502 for detecting objects behind the vehicle 1502. In some embodiments, the first three-dimensional imaging system 1510a mounted on the front side the of vehicle 1502 may be configured for long range detection, and the second three-dimensional imaging system 1510b, the third three-dimensional imaging system 1510c, and the fourth three-dimensional imaging system 1510d may be configured for medium or short range detection.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

What is claimed is:

1. A three-dimensional imaging system comprising:
   a first illumination source configured to project a first fan of light toward one or more objects in a field of view, the first fan of light generating a first illumination line as the first fan of light strikes the one or more objects;
   a second illumination source configured to project a second fan of light toward the one or more objects, the second fan of light generating a second illumination line as the second fan of light strikes the one or more objects, wherein the first illumination source and the second illumination source are configured to scan the first fan of light and the second fan of light synchronously laterally across the field of view such that a plane of the first fan of light and a plane of the second fan of light are kept substantially parallel to each other and spaced apart from each other laterally in a direction perpendicular thereto;
   a camera configured to capture images of the first illumination line and the second illumination line as the first fan of light and the second fan of light are scanned over the field of view, wherein the camera includes an image sensor comprising a plurality of pixels; and
   a processor coupled to the camera and configured to:
      for each respective pixel of the plurality of pixels of the image sensor:
         determine a respective time delay between a time when the first illumination line appears in the respective pixel and a time when the second illumination line appears in the respective pixel; and
         determine a distance from the camera to a respective portion of the one or more objects corresponding to the respective pixel based on the respective time delay; and
      construct a three-dimensional image of the one or more objects based on the distance from the camera to each respective portion of the one or more objects determined from each pixel of the plurality of pixels.

2. The three-dimensional imaging system of claim 1 wherein:
   the first illumination source includes:
      a first laser source configured to emit a first laser beam;
      a first optical element configured to convert the first laser beam into the first fan of light; and
      a first mirror configured to reflect the first fan of light toward the one or more objects; and the second illumination source includes:
  a second laser source configured to emit a second laser beam;
  a second optical element configured to convert the second laser beam into the second fan of light; and
  a second mirror configured to reflect the second fan of light toward the one or more objects.

3. The three-dimensional imaging system of claim 2 wherein the first mirror and the second mirror are configured to be scanned synchronously so as to scan the first fan of light and the second fan of light synchronously laterally across the one or more objects.

4. The three-dimensional imaging system of claim 3 wherein:
  the first illumination source includes a first motor configured to scan the first mirror, and a first encoder configured to measure an angle of the first mirror;
  the second illumination source includes a second motor configured to scan the second mirror, and a second encoder configured to measure an angle of the second mirror; and
  the processor is coupled to the first motor, the second motor, the first encoder, and the second encoder, and is configured to control the first motor and the second motor based on the angle of the first mirror measured by the first encoder and the angle of the second mirror measured by the second encoder, so as to synchronize the scanning of the first mirror and the scanning of the second mirror.

5. The three-dimensional imaging system of claim 4 wherein each of the first motor and the second motor comprises one of a stepper motor, a voice coil motor, a piezoelectric transducer, or a servo motor.

6. The three-dimensional imaging system of claim 2 wherein each of the first mirror and the second mirror comprises a polygonal mirror and is configured to be rotated so as to scan the first fan of light and the second fan of light synchronously laterally across the one or more objects.

7. The three-dimensional imaging system of claim 3 wherein the first mirror and the second mirror are mechanically linked to each other, and are configured to be scanned synchronously by using a single motor.

8. The three-dimensional imaging system of claim 2 wherein each of the first mirror and the second mirror comprises an acoustic optical deflector configured to deflect the first fan of light and the second fan of light to a plurality of angular positions.

9. The three-dimensional imaging system of claim 2 wherein each of the first optical element and the second optical element comprises a cylindrical lens or a diffractive optical element.

10. The three-dimensional imaging system of claim 1 wherein:
  the first illumination source includes:
    a first laser source configured to emit a first laser beam; and
    a first cylindrical mirror configured to convert the first laser beam into the first fan of light directed toward the one or more objects;
  the second illumination source includes:
    a second laser source configured to emit a second laser beam; and
    a second cylindrical mirror configured to convert the second laser beam into the second fan of light directed toward the one or more objects; and
  the first cylindrical mirror and the second cylindrical mirror are configured to be scanned synchronously so as to scan the first fan of light and the second fan of light synchronously laterally across the one or more objects.

11. The three-dimensional imaging system of claim 1 is used in a vehicle for obstacle detection.

* * * * *